UNITED STATES PATENT OFFICE.

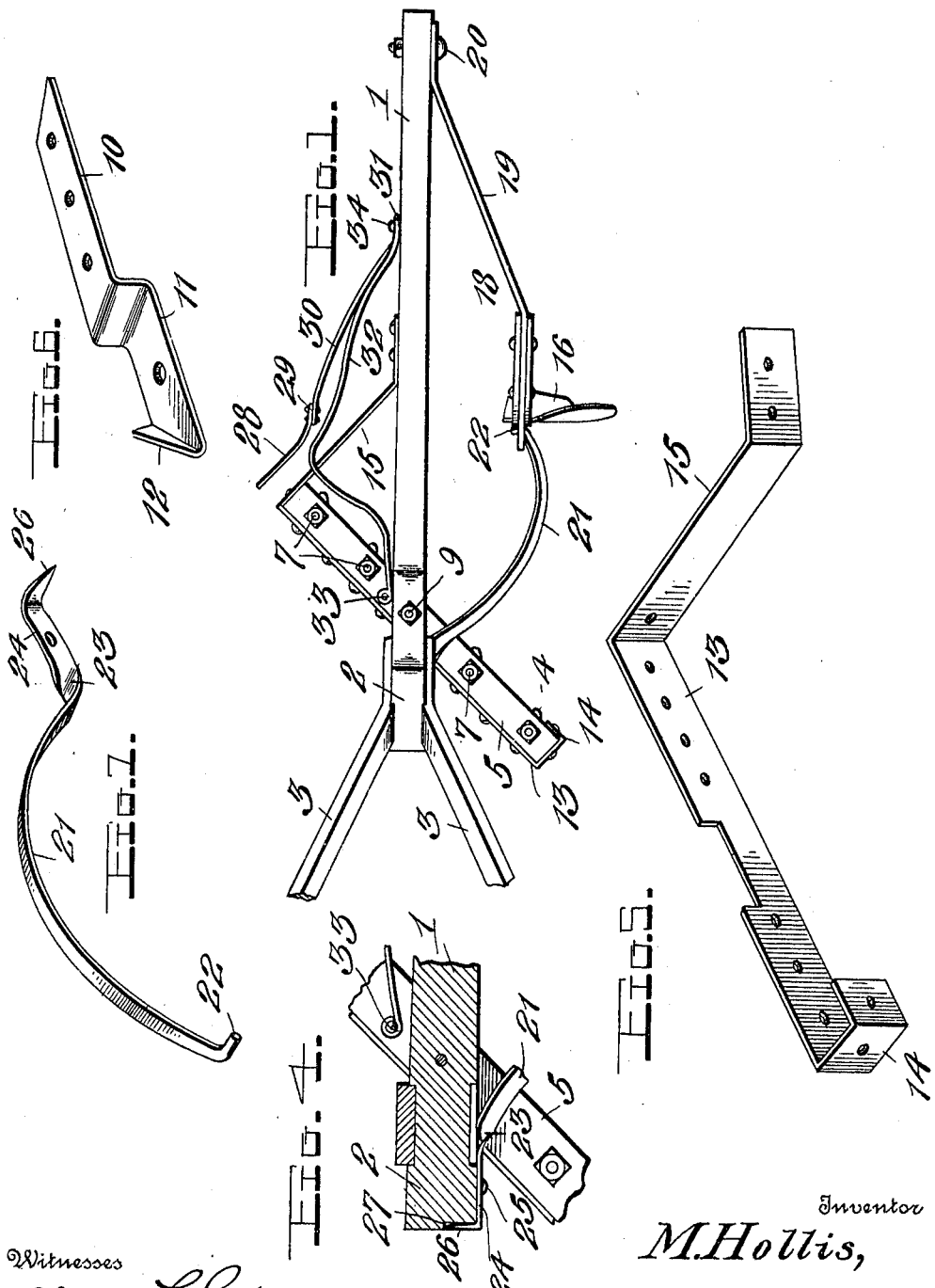

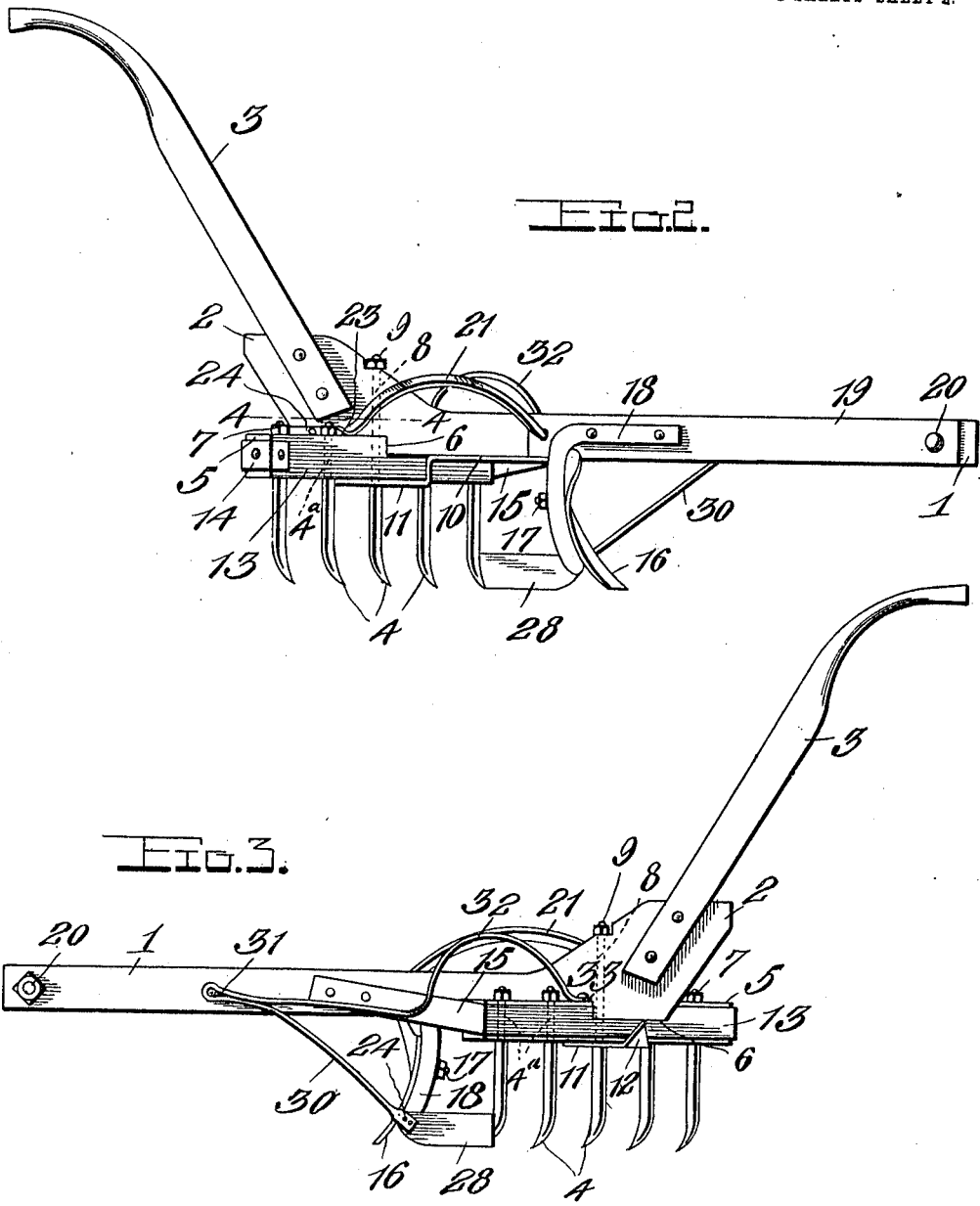

MOSES HOLLIS, OF VERNON, ALABAMA.

COMBINED PLOW AND HARROW.

980,262.  Specification of Letters Patent.  Patented Jan. 3, 1911.

Application filed April 9, 1910. Serial No. 554,400.

*To all whom it may concern:*

Be it known that I, MOSES HOLLIS, a citizen of the United States, residing at Vernon, in the county of Lamar and State of Alabama, have invented certain new and useful Improvements in Combined Plows and Harrows, of which the following is a specification, reference being had to the accompanying drawings.

This invention is a combined plow and harrow, whereby the center of the space between two rows of plants may be plowed, and at the same time the ground along one of the rows will be broken up and worked toward the plants to cultivate the same.

The object of the invention is to provide a simple and practical device of this character which may be produced at a comparatively small cost, and will be strong and durable in use and exceedingly effective in operation.

With the above and other objects in view, the invention consists of the novel construction, combination and arrangement of parts, hereinafter fully described and claimed, and illustrated in the accompanying drawings in which:—

Figure 1 is a top plan view of my improved combined plow and harrow; Figs. 2 and 3 are side elevations looking at opposite sides of the same; Fig. 4 is a detail horizontal section taken on the plane indicated by the line 4—4 in Fig. 2; and Figs. 5, 6 and 7, are detail views of parts.

The invention comprises a beam 1 having an enlarged rear end 2, and the opposite sides of which latter are secured to the lower ends of rearwardly and upwardly inclined handle bars 3.

The harrow comprises a plurality of depending teeth or small shovels 4 arranged in a diagonal beam or bar 5 disposed beneath the enlarged rear portion 2 of the main beam and having the center of its top formed with a diagonally extending recess 6 which receives said beam 1. The teeth 4 have their upper ends reduced to provide shanks 4ª which pass through openings in the diagonally arranged beam 5 and which have retaining nuts 7 upon their threaded upper extremities, whereby the harrow teeth are securely fastened. The central tooth has its shank extended, as shown at 8, to project through the beam 1 and receive a retaining nut 9, whereby the diagonal beam 5 will be fastened to the main beam 1. The connection between these two beams is also effected by providing a metal strap 10 on the bottom of the rear portion of the main beam 1. This strap 10 has its forward end secured to the beam 1 and its rear portion is downwardly offset, as shown at 11, to receive the beam 5, and its extremity is upturned as shown at 12. The offset portion 11 has an opening to receive the central harrow tooth 4. The connection between the two beams is further strengthened and the harrow beam 5 is reinforced by a metal strap 13 which extends across the rear face of the beam 5 and has one end bent around the rearmost extremity of said beam, as shown at 14, and its other end bent around the foremost extremity of the beam 5, and then extended inwardly to provide a brace 15 which is secured to one side of the beam 1.

It will be noted that the peculiar construction and arrangement of the parts just described will effectively unite the two beams.

The plow comprises a plow share or blade 16 adjustably secured at 17 to the slotted depending portion of a standard 18 on the rear end of a supplemental beam 19. The latter has its front end secured by a transverse bolt 20 to one side of the forward portion of the main beam 1, and the rear part of the supplemental beam or bar 19 is spaced from the intermediate portion of the beam 1 so that the plow 16 will travel in the bottom of the furrow or space between two rows of plants, while the row of harrow teeth will break up the ground turned by the plow and also cultivate one side of one row of the plants. To support the rear end of the supplemental plow beam 19, I provide a resilient brace 21 constructed of a metal bar or strap and having at its forward end a laterally projecting hook 22 to enter the transverse opening in the extended rear end of the supplemental beam 19. The brace 21 is curved longitudinally and has its depending rear portion twisted, as shown at 23, to engage the upper and rear faces of the harrow beam 5 close to the large rear end 2 of the main beam, and to provide a flat portion 24 which bears against one side of said enlargement 2 of the main beam. The flat portion 24 is apertured to receive a fastening 25 which enters the main beam to secure the rear end of the brace 21, and said flat portion 24 has a reduced rear extremity bent at right angles to provide an arm 26 which is adapted to enter a notch or seat 27 formed in the rear face or extremity of the main beam, as shown more clearly in Fig. 4. The peculiar construction and arrangement of the brace 21 causes the same to yieldably support the plow and maintain it in spaced relation with respect to the main beam.

In order to prevent the earth from being thrown over upon the row of plants, I provide an angularly arranged deflector plate 28 which is arranged diagonally in advance of the foremost harrow tooth 4. This deflector plate is disposed vertically and has its forward end fixed at 29 to an outwardly, downwardly and rearwardly inclined, resilient arm 30 formed from one end of a resilient metal rod or bar which is bent upon itself, as shown at 31, to provide a rearwardly extending brace arm 32, which latter is curved longitudinally and has its rear extremity bent to form an eye which is secured at 33 on the top of the harrow beam 5 adjacent one side of the main beam. The bent portion 31 of the resilient member or arm 30 is secured at 34 to one side of the forward portion of the beam 1.

From the foregoing it will be seen that my improved implement may be effectively used in cultivating a row of plants, since the plow will work in the center of the furrow and the harrow teeth will break up the earth thrown over by the plow and will also work the earth up against the plants, while the deflector will prevent the latter from being covered by the earth.

Having thus described the invention, what is claimed is:

1. The combination of a main beam, a diagonally arranged beam carrying depending harrow teeth and having its central portion secured to the rear portion of the main beam, and a reinforcing strap extending across the rear face of a harrow beam and having its end portions bent around the ends of said beam, the end portion of said strap at the foremost end of the beam being extended inwardly and secured to the main beam to provide a brace arm for the harrow beam.

2. The combination of a main beam, a diagonally arranged beam carrying depending harrow teeth and having its central portion secured to the rear portion of the main beam, a bottom strap having its forward end secured to the bottom face of the main beam and its rear portion offset to extend across the bottom of the harrow beam and having its rear extremity upturned, and a metal strap extending along and secured to the rear face of the harrow beam, the extremities of said strap being bent around said beam, and the extremity of said strap at the front end of said beam being extended inwardly and secured to one side of the main beam to provide a brace arm.

3. The combination of a beam carrying at its rear earth-working means and also having at its rear a seat, a supplemental beam having its front end secured to one side of the front end of the main beam and its rear portion offset and spaced from the intermediate portion of the main beam, said rear portion being also formed with a transverse opening, a plow carried by the offset rear portion of the supplemental beam, and a brace strap curved longitudinally and having at its front end a hook to engage the opening in the rear end of the supplemental beam, the rear end of said brace strap being twisted to provide a flat, apertured portion to engage one side of the rear portion of the main beam and to provide a reduced angularly projecting finger to enter said seat in the rear of the main beam, and a fastening passed through the aperture in the flat portion of the brace strap.

In testimony whereof I hereunto affix my signature in the presence of two witnesses.

MOSES HOLLIS.

Witnesses:
  AUGGIE McDOUGAL,
  CLAUDIUS McDOUGAL.